(12) United States Patent
Wu

(10) Patent No.: US 12,534,008 B2
(45) Date of Patent: Jan. 27, 2026

(54) TRAY-TABLE STORAGE DEVICE

(71) Applicant: Hanghui Wu, Shaoxing (CN)

(72) Inventor: Hanghui Wu, Shaoxing (CN)

(73) Assignee: Hanghui Wu, Shaoxing (CN)

( * ) Notice: Subject to any disclaimer, the term of this patent is extended or adjusted under 35 U.S.C. 154(b) by 86 days.

(21) Appl. No.: 18/766,578

(22) Filed: Jul. 8, 2024

(65) Prior Publication Data

US 2026/0008398 A1 Jan. 8, 2026

(51) Int. Cl.
*B60N 3/00* (2006.01)

(52) U.S. Cl.
CPC .................... *B60N 3/004* (2013.01)

(58) Field of Classification Search
CPC ........ B60N 3/004; B60N 3/002; B60N 3/001; A47F 2005/002; A47G 11/04; A47B 2200/0085
USPC ..................................... 150/44, 90
See application file for complete search history.

(56) References Cited

U.S. PATENT DOCUMENTS

| | | | | |
|---|---|---|---|---|
| 9,051,087 B1 * | 6/2015 | Daniels | ................... | B60N 3/004 |
| D771,546 S * | 11/2016 | Dall'Era | ...................... | D12/416 |
| 9,643,727 B2 * | 5/2017 | Dall'Era | ................ | B64D 11/06 |
| 12,420,931 B2 * | 9/2025 | Prathipati | .......... | B64D 11/0627 |
| 2005/0009151 A1 * | 1/2005 | Chase | .................... | C12P 41/006 |
| | | | | 435/106 |
| 2009/0223418 A1 * | 9/2009 | Ferrara | .................. | B60N 3/004 |
| | | | | 108/14 |
| 2012/0020586 A1 * | 1/2012 | Gilbert | ............... | A47G 27/0243 |
| | | | | 383/4 |
| 2015/0122159 A1 * | 5/2015 | Valcic | ..................... | B60R 7/043 |
| | | | | 108/26 |
| 2017/0071375 A1 * | 3/2017 | Smith | ................ | B64D 11/0638 |
| 2017/0291710 A1 * | 10/2017 | Barr-Perea | ......... | B61D 33/0007 |
| 2021/0145193 A1 * | 5/2021 | Presley | .................. | B60N 3/004 |
| 2022/0079311 A1 * | 3/2022 | Logan | .................. | A45C 7/0027 |
| 2024/0023735 A1 * | 1/2024 | Westhoven | ............... | A45F 5/00 |

* cited by examiner

*Primary Examiner* — Daniel J Rohrhoff

(74) *Attorney, Agent, or Firm* — Ming Jiang; OPENPTO US LLC

(57) ABSTRACT

Provided is a tray-table storage device, including a sleeve structure and an extension storage structure. The sleeve structure includes a front surface, a common layer and a back surface. A sleeving cavity having an opening at one side thereof is defined between the back surface and the common layer. A first storage cavity having an opening at one side thereof is defined between the front surface and the common layer. The opening of the first storage cavity is orientated towards a direction opposite to the opening of the sleeving cavity. The extension storage structure is detachably connected to a bottom of the back surface, and includes at least two fabric layers. At least one second storage cavity each having an opening at one side thereof is defined by the at least two fabric layers.

9 Claims, 8 Drawing Sheets

TRAY-TABLE STORAGE DEVICE

TECHNICAL FIELD

The present disclosure relates to the technical field of storage, and particularly to a tray-table storage device (i.e., a storage container equipped for a tray table).

BACKGROUND

With the rapid development of transportation, the frequency at which people use public transportation is increasing. Generally, in long-distance travel, especially by plane, train, or couch bus, a passenger carries not only clothes and toiletries, but also essential items such as a laptop, tablet, mobile phone, charger, headphone, passport, and wallet.

Of course, the clothes and toiletries are usually packed in a suitcase and then placed on a luggage rack therewith. However, for electronic devices, food, and drinking water that are used at hand, most of them are carried around in a small carry-on bag or held in hand. However, the hands have limited holding capacity, and thus they cannot be free. If they are carried around in the small carry-on bags, after such items are taken from the small carry-on bag, the small bag needs to be held or placed on the legs, which occupies too much space on the already narrow seat, thereby affecting the passenger's comfort. Although the seatback of the existing traffic tool (including airplanes and trains) is provided with a storage net bag or a tray table that can be rotated to a horizontal position for use, the tray table cannot support an item thereon in an upright state, and the storage net bag cannot make the items therein organized and it has a limited storage capacity. All of them cannot meet the actual usage needs of passengers.

SUMMARY

In order to solve the problem mentioned above, the present disclosure provides a tray-table storage device.

For this, the present disclosure provides following technical solution. A tray-table storage device is proposed, which includes a sleeve structure and an extension storage structure.

The sleeve structure includes a front surface, a common layer, and a back surface. The common layer is located between the front surface and the back surface. Opposite edges of the front surface in a horizontal direction are aligned and connected with opposite edges of the common layer in the horizontal direction respectively, and also aligned and connected with opposite edges of the back surface in the horizontal direction respectively, thereby defining two closed edges. An upper edge of the back surface is connected with an upper edge of the common layer, and a sleeving cavity having an opening at one side thereof is defined between the back surface and the common layer. A bottom edge of the front surface is connected with a bottom edge of the common layer, and a first storage cavity having an opening at one side thereof is defined between the front surface and the common layer. The opening of the first storage cavity is orientated towards a direction opposite to the opening of the sleeving cavity.

The extension storage structure is detachably connected to a bottom of the back surface. The extension storage structure includes at least two fabric layers. Opposite edges of the at least two fabric layers in the horizontal direction are respectively aligned and connected together, bottom edges of every two adjacent fabric layers are connected together, and at least one second storage cavity each having an opening at one side thereof is defined.

In some embodiments of the disclosure, the extension storage structure includes three fabric layers. The three fabric layers include a back layer, an interlayer, and a front layer.

In some embodiments of the disclosure, the front layer is an outermost layer, and a side wall of the front layer facing the interlayer is provided with multiple first connecting portions connected with the interlayer. Each of the first connecting portions is in linear connection with the interlayer, and a separate cavity is defined by a space between every two adjacent first connecting portions.

In some embodiments of the disclosure, a bottom of the back surface is provided with a first extension portion, and an upper end of the back layer of the extension storage structure is provided with a second extension portion. The first extension portion is detachably connected with the second extension portion.

In some embodiments of the disclosure, the first extension portion and the second extension portion are connected through any of a hook and loop fastener, a zipper, or a concealed button.

In some embodiments of the disclosure, a notch is provided at each of opposite edges of the first extension portion in the horizontal direction.

In some embodiments of the disclosure, an expansion layer is further provided between the front surface and the common layer. Opposite edges of the expansion layer in the horizontal direction are aligned and connected respectively with the opposite edges of each of the front surface and the common layer in the horizontal direction. A bottom edge of the expansion layer is connected with each of the bottom edge of the front surface and the bottom edge of the common layer. At least two third storage cavities are defined by the expansion layer with the front surface and the common layer.

In some embodiments of the disclosure, a side wall of the expansion layer facing the common layer is provided with multiple second connecting portions connected with the common layer. Each of the second connecting portions is connected with the common layer along a line, and a separate cavity is defined by a space between every two adjacent second connecting portions.

In some embodiments of the disclosure, each of the sleeve structure and the extension storage structure is made of an elastic fabric, and the elastic fabric is any of stretch cotton, stretch nylon, or a rubber fiber blended fabric.

Compared with prior art, the present disclosure has the following beneficial effects.

First, in the tray-table storage device provided by the present disclosure, two cavities are defined by the front surface, the common layer and the back surface, which saves the production materials. When it needs to be used, the sleeve structure is sleeved onto a tray table in such a manner that the tray table is received in the sleeving cavity having an opining at one side that is defined by the back surface and the common layer; that is, convenient and quick installation is enabled. When the tray table is in an upright state, the first storage cavity defined by the front surface and the common layer serves as a space for storing carry-on items. No matter the tray table is in the upright state or is rotated to a horizontal state, the second storage cavity of the extension storage structure can serve as a space for storing the carry-on items. In this way, the storage space is expanded, meeting the user's storage needs.

Second, according to the present disclosure, the extension storage structure is detachable from the sleeve structure, and the sleeve structure can be used independently. As such, the users can choose whether to detach the extension storage structure from the sleeve structure according to their own storage needs.

Third, according to the present disclosure, the overall structure is simple and made of an elastic fabric, which is easy to fold and store, and occupies a small space. Thus, it can be easily carried around, particularly suitable for long-distance travels.

DETAILED DESCRIPTION OF EMBODIMENTS

The description will be given clearly and comprehensively below in conjunction with technical schemes in the embodiments of the present disclosure. It is obvious that the described embodiments are only a part rather than all of the embodiments of the present disclosure. All other embodiments, obtained by those skilled in the art based on the embodiments in the present disclosure without making any creative labor, shall fall within the scope of protection of the present disclosure.

Embodiment 1

Figure 1:
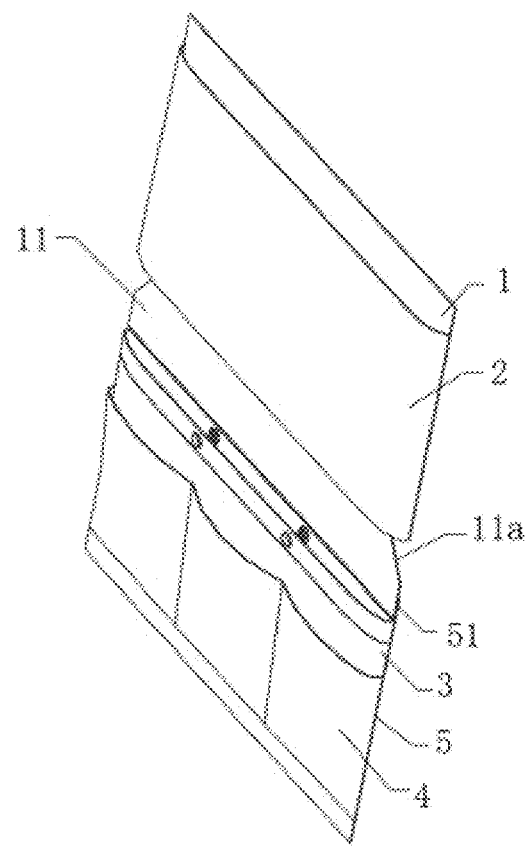
FIG. 1 is a schematic diagram of a main structure of a tray-table storage device provided by the present disclosure.
Figure 4:
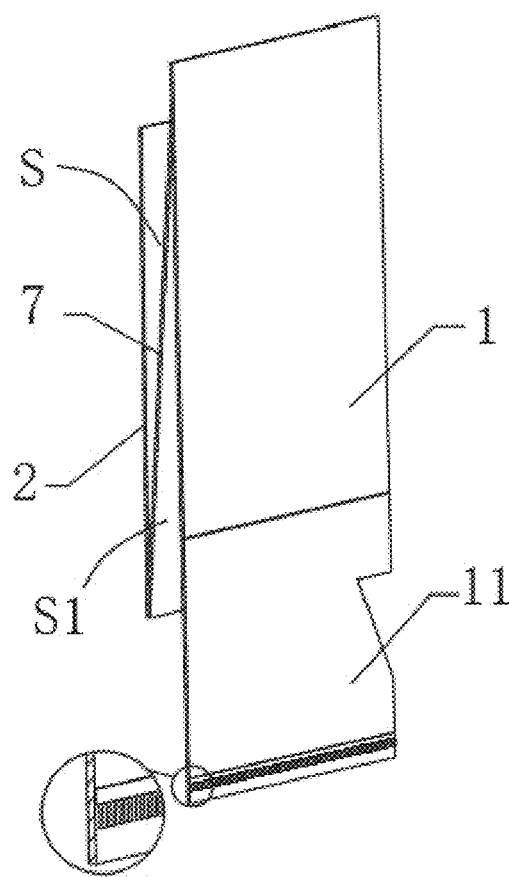
FIG. 4 is a partial cutaway view schematically illustrating a sleeve structure of the tray-table storage device in the present disclosure.

This embodiment provides a tray-table storage device. As shown in FIG. 1, the entire tray-table storage device is composed of a sleeve structure and an extension storage structure. The sleeve structure includes a front surface 2, a common layer 7, and a back surface 1. As shown in FIG. 4, the common layer 7 is located between the front surface 2 and the back surface 1. Opposite edges of the front surface 2 in a horizontal direction are aligned and connected with opposite edges of the common layer 7 in the horizontal direction respectively, and also aligned and connected with opposite edges of the back surface 1 in the horizontal direction respectively, thereby defining two closed edges. An upper edge of the back surface 1 is connected with an upper edge of the common layer 7, and a sleeving cavity having an opening at one side thereof is defined between the back surface 1 and the common layer 7. Specifically, in an alternative implementation, after the opposite edges of the front surface 2, the common layer 7 and the back surface 1 in the horizontal direction are aligned respectively, the two closed edges may be formed preferably by sewing together the aligned edges with a sewing machine. Of course, it is not limited to the sewing method, a zipper, a concealed button or a hook and loop fastener may also be used. From the point of view of durability, sewing can make the edges of the defined sleeving cavity the most secure, which is not prone to a seam opening that would lead to the falling of the stored items.

Figure 2:
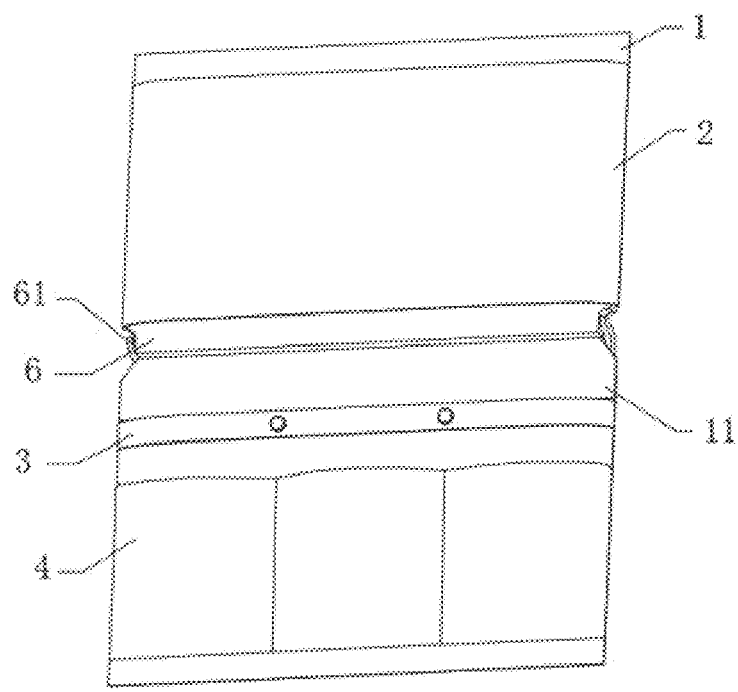
FIG. 2 is a schematic diagram of the storage device provided by the present disclosure when being sleeved on a tray table in an upright state.

In addition, a bottom edge of the front surface 2 is connected with a bottom edge of the common layer 7, and a first storage cavity having an opening at one side thereof is defined between the front surface 2 and the common layer 7. Similarly, the bottom edge of the front surface 2 and the bottom edge of the common layer 7 are sewed together. The opening of the first storage cavity is orientated towards a direction opposite to the opening of the sleeving cavity. The first storage cavity is denoted as S in FIG. 4, and the opening thereof is orientated upwards. The sleeving cavity is denoted as S1 in FIG. 4, and the opening thereof is orientated downwards. The purpose of adopting such setting is to adapt to a tray table 6 provided on the seatback set of an aircraft or a train. For example, when the tray table 6 in an upright state, the sleeve structure may be sleeved onto the tray table 6 by receiving the tray table 6 into the sleeving cavity through its opening orientated downwards, until the tray table 6 is completely wrapped. As can be seen, this enables installation to be convenient and fast. As shown in FIG. 2 in which the sleeve structure has been sleeved, the opening of the first storage cavity S is located on the outer side of the tray table 6, and the opening of the first storage cavity S is also exposed, which is more convenient for users to place items into the first storage cavity S and take out the items therefrom.

Figure 3:
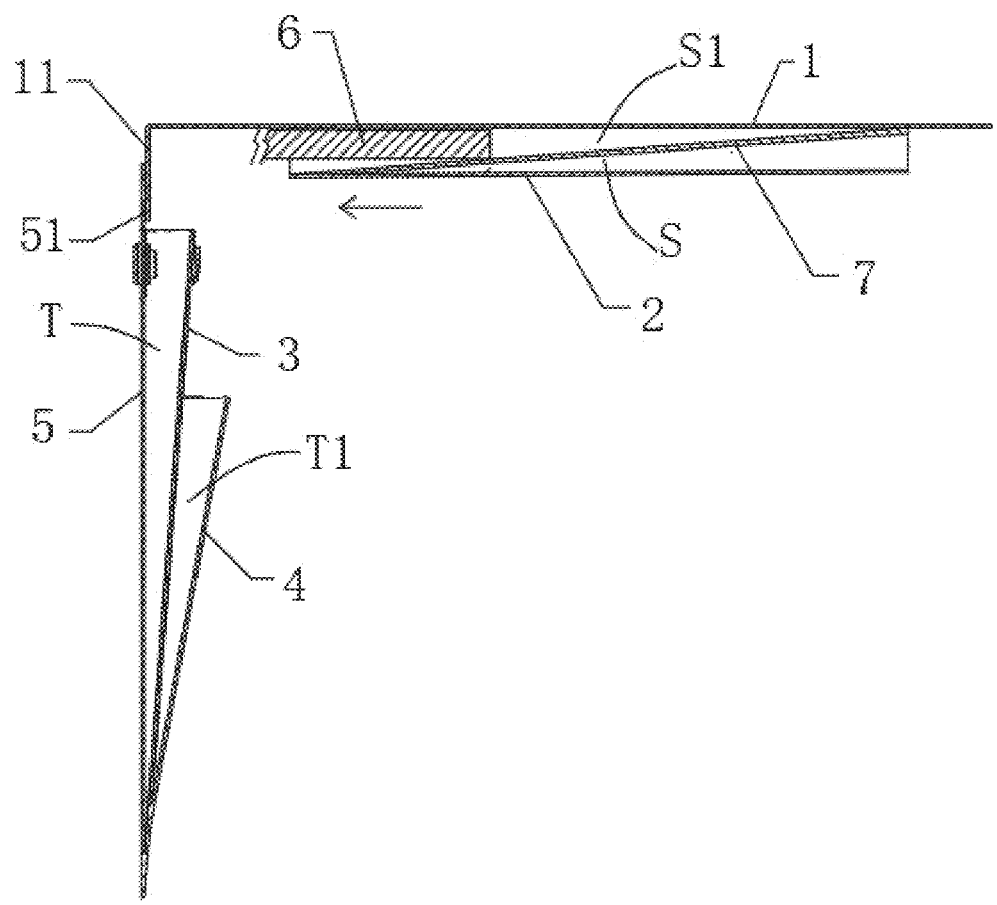
FIG. 3 is a schematic diagram of the storage device provided by the present disclosure when being sleeved on a tray table in a horizontal state.

As shown in FIG. 2 and FIG. 3, when the tray table 6 is rotated to a horizontal position using a support rod 61 around a position where the support rod 61 is hinged to the seatback, the front surface 2 is located on the bottom side of the tray table 6, and the back surface 1 is supported by an upper surface of the tray table 6. The he items are separated from the upper surface of the tray table 6, ensuring the cleanliness of the items and preventing the user's carry-on items from being stained by residual stains on the tray table 6 left by other people.

It should be noted that, the two cavities are defined using the front surface 2, the common layer 7 and back surface 1, which saves the fabrication materials and thus saves the production cost.

In addition, the extension storage structure is detachably connected to a bottom of the back surface 1. The extension storage structure is a further expansion on the basis of the sleeve structure, for the purpose of using the extension storage structure to increase the storage space when the first storage cavity S is not sufficient to receive the user's items, thereby meeting the storage need. Specifically, the extension storage structure includes at least two fabric layers. Opposite edges of the at least two fabric layers in the horizontal direction are respectively aligned and connected together, bottom edges of every two adjacent fabric layers are connected together, and at least one second storage cavity each having an opening at one side thereof is defined. It is not limited to two fabric layers, but the minimum number of the fabric layers is two, thus a storage space can be defined by sewing the opposite edges in the horizontal direction and the bottom edges, thereby meeting the storage need. There may also be three, four, or more fabric layers. More storage spaces may also be provided by dividing the storage cavity between the outermost two fabric layers, for storing items.

As shown in FIG. 3, the extension storage structure includes three fabric layers, which are respectively a back layer 5, an interlayer 3, and a front layer 4. Opposite edges of the back layer 5 in the horizontal direction are aligned with opposite edges of the interlayer layer 3 in the horizontal direction respectively, and also aligned with opposite edges of the front layer 4 in the horizontal direction respectively, and the aligned edges are sewed together. In addition, bottom edges of the back layer 5, the interlayer 3, and the front layer 4 are aligned and sewed together, thereby defining a storage space T and a storage space T1. When the tray table 6 is in the upright state or is rotated to the horizontal state, the extension storage structure is always in the vertical direction, and openings of the storage space T and the storage space T1 are always oriented upwards. The two storage spaces can be used to store carry-on items. In this way, the storage space is increased, and the storage needs of users are met.

The bottom of the back surface 1 is provided with a first extension portion 11. It should be noted that a notch 11a is provided at each of opposite edges of the first extension portion 11 in the horizontal direction. As shown in FIG. 2, when the tray table 6 is received in the sleeving cavity S1 through its opening oriented downwards and the tray table 6 is fully wrapped, the notches 11a are exactly located at positions where the support rod 61 is rotationally connected to the tray table 6. That is, the positions of the support rod 61 are avoided by means of the notches 11a. When the tray table 6 is rotated from the upright state to the horizontal state using the support rod 61, the first extension portion 11 can smoothly bypass the support rod 61 by means of the notches 11a, so that the back layer 5 of the entire extension storage structure can be in a vertical state without any obstruction or curling phenomenon.

Figure 5:
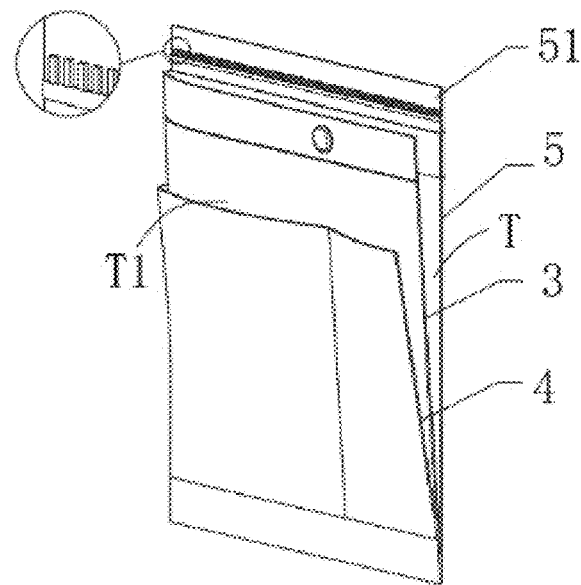
FIG. 5 is a partial cutaway view schematically illustrating an extension storage structure of the tray-table storage device in the present disclosure.

Of course, in order to meet more storage needs, as shown in FIG. 5, the front layer 4 is an outermost layer, and a side wall of the front layer 4 facing the interlayer 3 may be provided with multiple first connecting portions connected with the interlayer 3. Each first connecting portion is in linear connection with the interlayer (that is, each first connecting portion is connected with the interlayer along a line). As for the connection between the first connecting portion and the interlayer 3, multiple separated points may be selected in the middle part of the front layer 4, and the front layer and the interlayer are sewed together by sewing from top to bottom along the separated points; as such, a separate cavity can be defined by the space between every two adjacent first connecting portions, for storing items of a small volume separately. Of course, the separate cavities here may have a same volume or different volume, according to classification and storage needs.

Embodiment 2

In the present disclosure, the extension storage structure is detachable from the sleeve structure, and the sleeve structure can be used independently. As such, the users can choose whether to detach the extension storage structure from the sleeve structure according to their own storage needs.

The bottom of the back surface 1 is provided with the first extension portion 11, and an upper end of the back layer 5 of the extension storage structure is provided with a second extension portion 51. The first extension portion 11 is detachably connected with the second extension portion 51. After the first extension portion 11 is detached from the second extension portion 51, the extension storage structure can be detached from the sleeve structure, and the sleeve structure can be then used independently.

Figure 6:
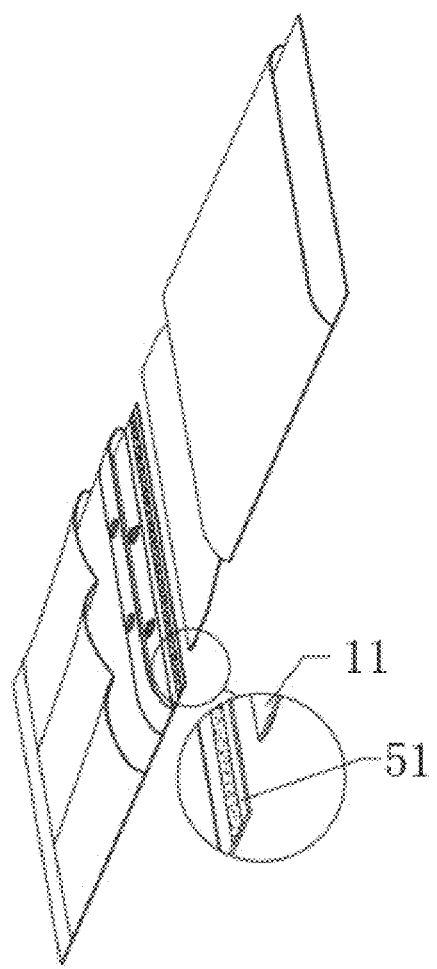
FIG. 6 is a schematic diagram illustrating a first embodiment of an assembly structure for assembling the sleeve structure and the extension storage structure in the present disclosure.
Figure 7:
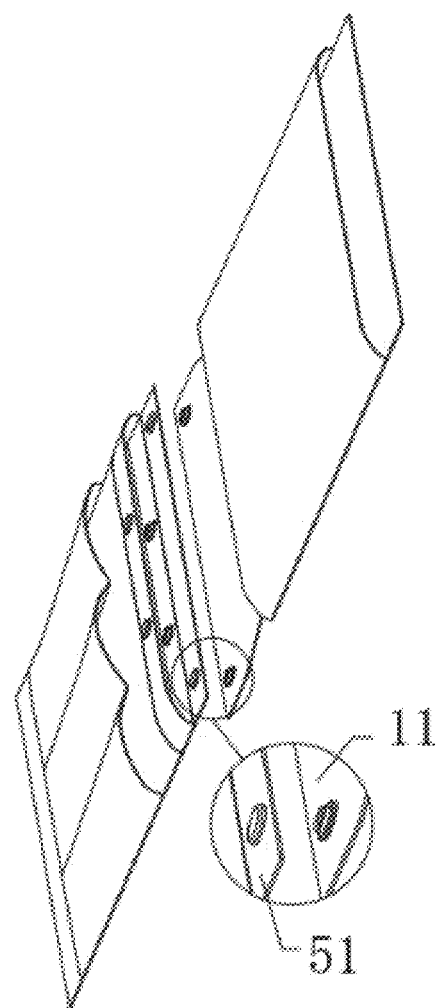
FIG. 7 is a schematic diagram illustrating a second embodiment of the assembly structure for assembling the sleeve structure and the extension storage structure in the present disclosure.

The first extension portion 11 and the second extension portion 51 are connected through any of a hook and loop fastener, a zipper, or a concealed button. As shown in FIG. 4 and FIG. 5, the first extension portion 11 and the second extension portion 51 are connected through a zipper, and the first extension portion 11 and the second extension portion 51 may thus be conveniently assembled together. Accordingly, when it is unzipped, the first extension portion 11 may be detached from the second extension portion 51. As shown in FIG. 6, the first extension portion 11 and the second extension portion 51 are adhered through a hook and loop fastener. A loop part is arranged on the first extension portion 11, and a hook part is arranged on the second extension portion 51. When the loop part is adhered to the hook part, the first extension portion 11 and the second extension portion 51 are assembled together. By vigorously tearing apart the loop part and hook part that are adhered together, the first extension portion 11 may be detached from the second extension portion 51. As shown in FIG. 7, the first extension portion 11 and the second extension portion 51 are connected through a concealed button, and the first extension portion 11 and the second extension portion 51 may be assembled together by making a pin end and a box end of the concealed button fit together through pressing. By forcefully pulling apart the pin end and the box end, the first extension portion 11 may be detached from the second extension portion 51. Of course, other connection structures that can quickly assemble and separate the first extension portion 11 and the second extension portion 51 can be used.

Figure 8:
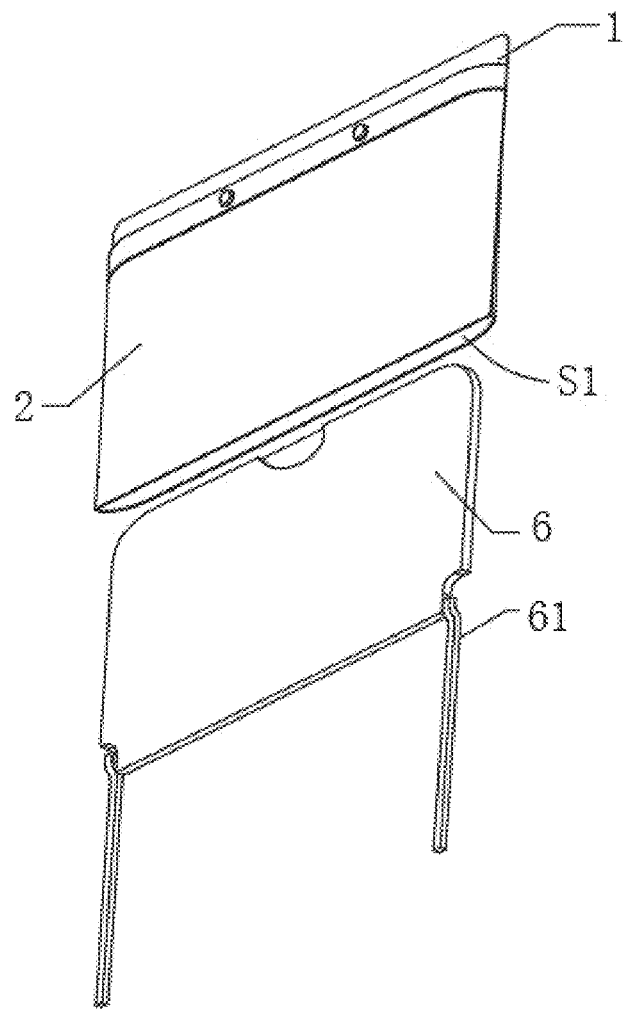
FIG. 8 is an exploded view illustrating assembly of the sleeve structure of the present disclosure and a tray table in an upright state.
Figure 9:
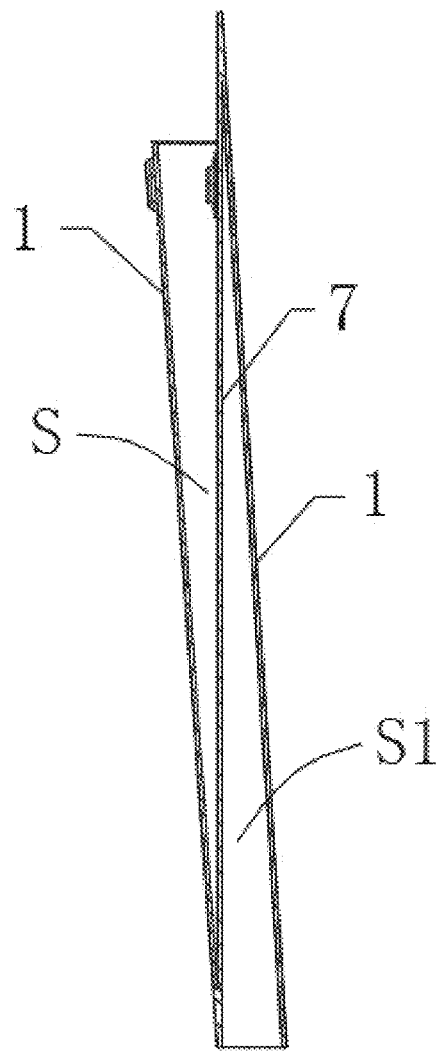
FIG. 9 is a sectional view of the sleeve structure of the present disclosure.

As shown in FIG. 8 and FIG. 9, when the sleeve structure is used alone, it may be used as follows. When the tray table 6 in the upright state, the sleeve structure may be sleeved onto the tray table 6 by receiving the tray table 6 into the sleeving cavity through its opening oriented downwards, until the tray table 6 is completely wrapped. The opening of the first storage cavity S is located on the outer side of the tray table 6, and the user can place items into the first storage cavity S and take out the items therefrom. The sleeve structure is not limited to application of the tray table 6 provided on the seatback of the airplane or train, and it can also be sleeved on a headrest of a car seat through the sleeving cavity S1 of the sleeve structure. The opening of the first storage cavity S is positioned at the back of the seat, which is also convenient for the user to place items into the first storage cavity S and take out the items therefrom. The opening of the first storage cavity S may be closed with a concealed button to prevent the items from falling off.

Figure 10:
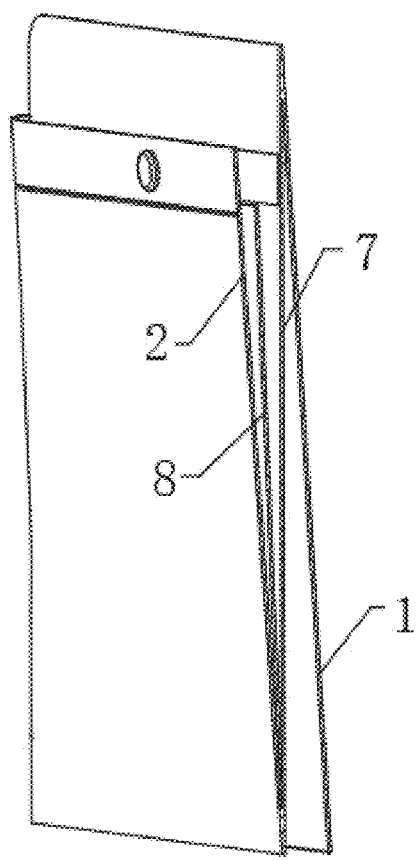
FIG. 10 is a cutaway view schematically illustrating the sleeve structure that is further improved in the present disclosure.

As shown in FIG. 10, an expansion layer 8 is further provided between the front surface 2 and the common layer 7. Opposite edges of the expansion layer 8 in the horizontal direction are aligned and connected respectively with the opposite edges of each of the front surface and the common layer in the horizontal direction. A bottom edge of the expansion layer 8 is connected with each of the bottom edge of the front surface 2 and the bottom edge of the common layer 7. Similarly, the opposite edges of the expansion layer 8 in the horizontal direction and the bottom edge of the expansion layer 8 are connected, by sewing, with the respective edges of the front surface 2 and the common layer 7, so that at least two third storage cavities are defined by the expansion layer 8 with the front surface 2 and the common layer 7. The purpose of providing the expansion layer 8 is to further increase independent storage spaced, thereby meeting the needs of receiving the users' carry-on items.

A side wall of the expansion layer 8 facing the common layer 7 may be provided with multiple second connecting portions connected with the common layer 7. Each second connecting portion is in linear connection with the common layer 7, and a separate cavity is defined by a space between every two adjacent second connecting portions. The second connecting portions are formed in such a manner that multiple separated points are selected in the middle part of the expansion layer 8, and the common layer and the expansion layer are sewed together by sewing from top to bottom along the separated points. As such, a separate cavity can be defined by the space between every two adjacent second connecting portions, for storing items of a small volume separately. The size of the separate cavities is set randomly at the time of sewing.

The sleeve structure and the extension storage structure each are made of an elastic fabric. Such storage device is usually made of a soft and stretchable material, including any of stretch cotton, stretch nylon, or rubber fiber blended fabric. These materials are stretchable and abrasion resistant, ensuring that the storage device can retain its shape and durability throughout its use. The material can be easily stretched to fit items of different sizes and shapes, and they can also quickly return to their original shapes, ensuring that the items are securely received.

In summary, the overall structure of the tray-table storage device is simple and made of an elastic fabric, which is easy to fold and store, and occupies a small space. Thus, it can be easily carried around, particularly suitable for long-distance travels.

Although the foregoing illustrates and describes the embodiments of the present disclosure, it is understandable to those skilled in the art that a variety of variations, modifications, substitutions and variants may be made to these embodiments without departing from the principle and spirit of the present disclosure, and the scope of the present disclosure is subject to the attached claims and their equivalents.

What is claimed is:

1. A tray-table storage device, comprising:
    a sleeve structure, wherein the sleeve structure comprises a front surface, a common layer, and a back surface; the common layer is located between the front surface and the back surface; opposite edges of the front surface in a horizontal direction are aligned and connected with opposite edges of the common layer in the horizontal direction respectively, and also aligned and connected with opposite edges of the back surface in the horizontal direction respectively, thereby defining two closed edges; an upper edge of the back surface is connected with an upper edge of the common layer, and a sleeving cavity having an opening at one side thereof is defined between the back surface and the common layer; a bottom edge of the front surface is connected with a bottom edge of the common layer, and a first storage cavity having an opening at one side thereof is defined between the front surface and the common layer; the opening of the first storage cavity is orientated towards a direction opposite to the opening of the sleeving cavity; and
    an extension storage structure detachably connected to a bottom of the back surface, wherein the extension storage structure comprises at least two fabric layers, opposite edges of the at least two fabric layers in the horizontal direction are respectively aligned and connected together, bottom edges of every two adjacent fabric layers are connected together, and at least one second storage cavity each having an opening at one side thereof is defined.

2. The tray-table storage device as claimed in claim 1, wherein the extension storage structure includes three fabric layers, and the three fabric layers comprises a back layer, an interlayer, and a front layer.

3. The tray-table storage device as claimed in claim 2, wherein the front layer is an outermost layer, and a side wall of the front layer facing the interlayer is provided with multiple first connecting portions connected with the interlayer; each of the first connecting portions is in linear connection with the interlayer, and a separate cavity is defined by a space between every two adjacent first connecting portions.

4. The tray-table storage device as claimed in claim 1, wherein a bottom of the back surface is provided with a first extension portion, an upper end of a back layer of the extension storage structure is provided with a second extension portion, and the first extension portion is detachably connected with the second extension portion.

5. The tray-table storage device as claimed in claim 4, wherein the first extension portion and the second extension portion are connected through any of a hook and loop fastener, a zipper, or a concealed button.

6. The tray-table storage device as claimed in claim 4, wherein a notch is provided at each of opposite edges of the first extension portion in the horizontal direction.

7. The tray-table storage device as claimed in claim 1, wherein an expansion layer is further provided between the front surface and the common layer; opposite edges of the expansion layer in the horizontal direction are aligned and connected respectively with the opposite edges of each of the front surface and the common layer in the horizontal direction; a bottom edge of the expansion layer is connected with each of the bottom edge of the front surface and the bottom edge of the common layer; at least two third storage cavities are defined by the expansion layer with the front surface and the common layer.

8. The tray-table storage device as claimed in claim 7, wherein a side wall of the expansion layer facing the common layer is provided with multiple second connecting portions connected with the common layer, each of the second connecting portions is in linear connection with the common layer, and a separate cavity is defined by a space between every two adjacent second connecting portions.

9. The tray-table storage device as claimed in claim 8, wherein each of the sleeve structure and the extension storage structure is made of an elastic fabric, and the elastic fabric is any of stretch cotton, stretch nylon, or a rubber fiber blended fabric.

* * * * *